United States Patent [19]
de Silva et al.

[11] Patent Number: 5,732,531
[45] Date of Patent: Mar. 31, 1998

[54] REUSABLE BALE WRAP KIT FOR COMPRESSED, RESILIENT FIBERS

[75] Inventors: San de Silva, Edmonton, Canada; William S. Sanderson, Gastonia, N.C.

[73] Assignee: Hoechst Celanese Corporation, Somerville, N.J.

[21] Appl. No.: 550,434

[22] Filed: Oct. 30, 1995

[51] Int. Cl.⁶ .................................................. B65B 51/08
[52] U.S. Cl. ........................ 53/416; 53/436; 53/219; 229/87.01
[58] Field of Search .................... 53/436, 416, 218, 53/219, 532; 229/87.01, 87.18; 206/83.5; 150/154

[56] References Cited

U.S. PATENT DOCUMENTS

| | | | |
|---|---|---|---|
| 1,311,367 | 7/1919 | Angier | 53/526 |
| 1,452,100 | 4/1923 | Wheildon | 206/83.5 |
| 1,557,881 | 10/1925 | Rogers | 206/83.5 |
| 2,539,725 | 1/1951 | Caraher | 53/436 |
| 3,056,245 | 10/1962 | Baum et al. | 53/436 |
| 3,120,727 | 2/1964 | Ziliox | 53/436 |
| 3,138,841 | 6/1964 | Namier et al. | 24/204 |
| 3,654,049 | 4/1972 | Ausnit | 229/87.01 |
| 3,733,769 | 5/1973 | Van Doorn | 53/24 |
| 3,816,970 | 6/1974 | Van Doorn et al. | 53/124 C |
| 4,157,754 | 6/1979 | Bartsch et al. | |
| 4,318,264 | 3/1982 | Rewitzer | 53/436 |
| 4,333,602 | 6/1982 | Geschwender | 229/44 R |
| 4,505,424 | 3/1985 | Chappars | 229/87.01 |
| 4,556,167 | 12/1985 | Fox et al. | 229/45 R |
| 4,628,709 | 12/1986 | Aeschbach et al. | 66/9 |
| 4,679,851 | 7/1987 | Solie et al. | 297/452 |
| 4,775,310 | 10/1988 | Fischer | 425/308 |
| 4,901,855 | 2/1990 | Furukawa | 206/389 |
| 5,457,855 | 10/1995 | Kenney et al. | 24/445 |

FOREIGN PATENT DOCUMENTS

| | | | |
|---|---|---|---|
| 0739282 | 7/1966 | Canada | 229/87.01 |
| A-0 324 577 | 7/1989 | European Pat. Off. | |
| 0 608 871 A2 | 8/1994 | European Pat. Off. | B65D 85/16 |
| A-608871 | 8/1994 | European Pat. Off. | |
| 398606 | 6/1909 | France . | |
| 2 221 841 | 2/1990 | United Kingdom | B65D 65/02 |

Primary Examiner—James F. Coan
Assistant Examiner—Gene L. Kim
Attorney, Agent, or Firm—Gregory N. Clements

[57] ABSTRACT

A method for wrapping a bale of compressed, resilient fibers comprises the steps of: providing a reusable bale wrap kit. The kit includes at least two pieces. Each piece, when joined with the other piece, is adapted for substantially enclosing and containing the bale of compressed, resilient fibers. Mushroom and loop fasteners are located along an edge portion of each piece and are adapted for joining the pieces to one another. Uncompressed, resilient fibers are provided. A portion of the uncompressed, resilient fibers are surrounded with the kit. Those fibers are compressed, and the mushroom and loop fasteners are engaged.

9 Claims, 3 Drawing Sheets

REUSABLE BALE WRAP KIT FOR COMPRESSED, RESILIENT FIBERS

FIELD OF THE INVENTION

A reusable bale wrap kit for compressed, resilient fibers is disclosed herein. The kit is adapted for enclosing and containing a bale of compressed, resilient fibers.

BACKGROUND OF THE INVENTION

Bale wrap kits for compressed, resilient fibers are known. The original idea for these kits was set forth by DeSilva. See: European Publication No. 608,871 published Aug. 3, 1994, which is incorporated herein by reference. DeSilva's kit, which utilized loop and hook type fasteners, successfully demonstrated that a reusable bale wrap kit for compressed resilient fibers was possible. That kit, however, was not commercially viable because the practical, reusable life of the kit, as demonstrated by actual field testing and plant simulations, was limited to a maximum 2 cycles or 1 reuse. The loop and hook type fasteners used in the DeSilva kit had shear strengths ranging from 34–40 pounds per square inch (psi). These commercially available loop and hook fasteners (i.e., high shear strength) are characterized by a dramatic drop in shear strength after just 1–2 uses. It appeared that the hooks shred the loops, thereby rendering the fastener inoperative.

In view of the low number of reuses attainable with the DeSilva kit, further improvements to enhance its reusability were necessary.

Non-reusable bale wrap kits are known. In U.S. Pat. No. 4,157,754, a non-reusable bale wrap kit, fastened together with a neoprene-chloroprene-rubber adhesive, is disclosed. That fiber bale weighs about 700 pounds and has a fiber density of about 19 pounds per cubic inch. Reusable packages, but not for use with compressed, resilient fibers, are known; these packages use VELCRO® fasteners. See: U.S. Pat. No. 4,333,602 and 4,556,167.

SUMMARY OF THE INVENTION

A method for wrapping a bale of compressed, resilient fibers comprises the steps of: providing a reusable bale wrap kit. The kit includes at least two pieces. Each piece, when joined with the other piece, is adapted for substantially enclosing and containing the bale of compressed, resilient fibers. Mushroom and loop fasteners are located along an edge portion of each piece and are adapted for joining the pieces to one another. Uncompressed, resilient fibers are provided. A portion of the uncompressed, resilient fibers are surrounded with the kit. Those fibers are compressed, and the mushroom and loop fasteners are engaged.

DESCRIPTION OF THE DRAWING

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
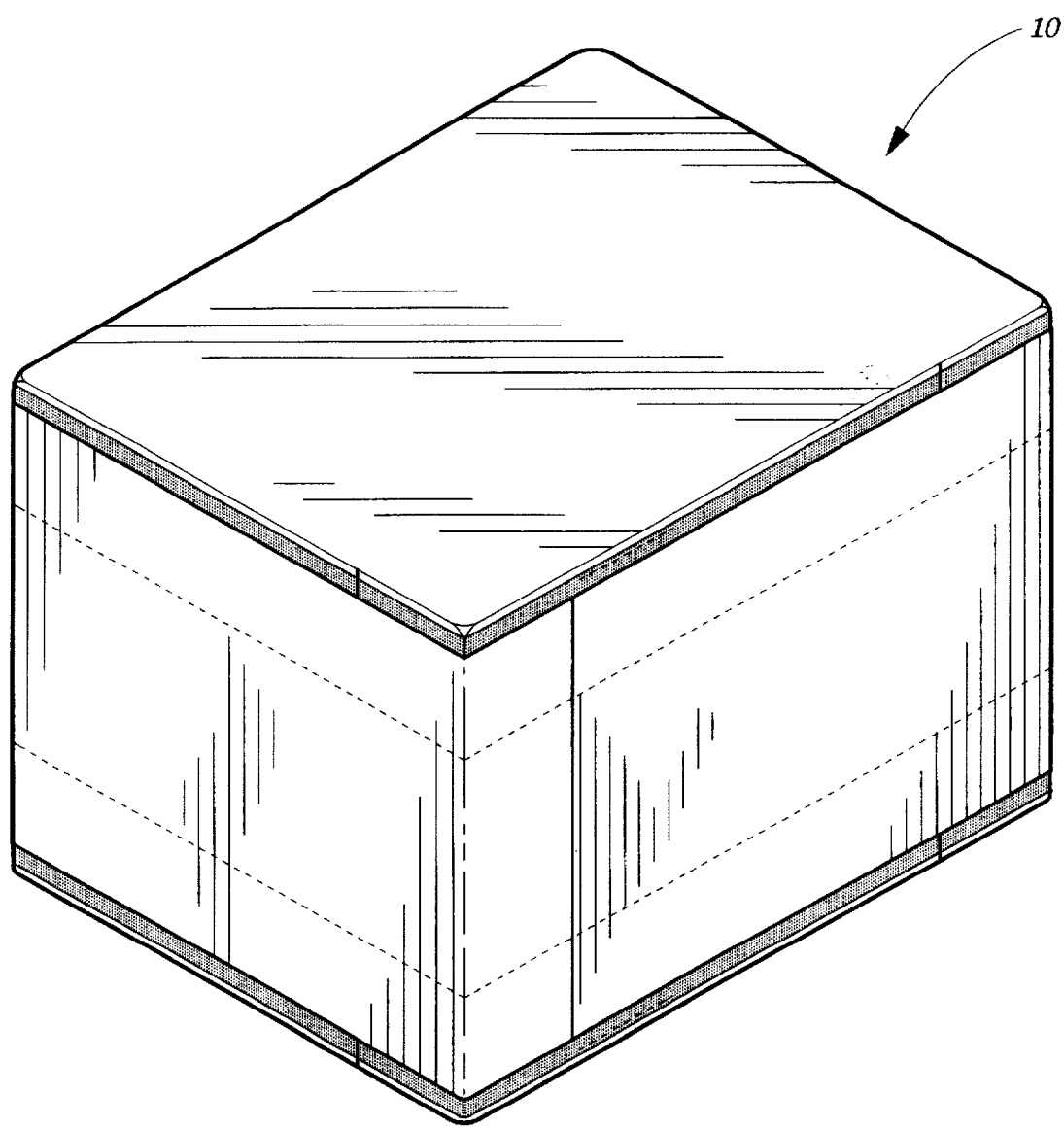
FIG. 1 is an isometric view of the instant invention, a bale wrap kit with mushroom and loop fasteners surrounding a bale of compressed, resilient fibers.

Referring to the drawings wherein like numerals indicate like elements, there are shown in FIG. 1 a bale wrap kit 10, made according to the present invention and surrounding a bale of compressed, resilient fibers. The fiber bale, for example, weighs about 1500 pounds, has a density of about 30 pounds per cubic inch, and has an internal force of about 10,000 pounds.

Figure 2:
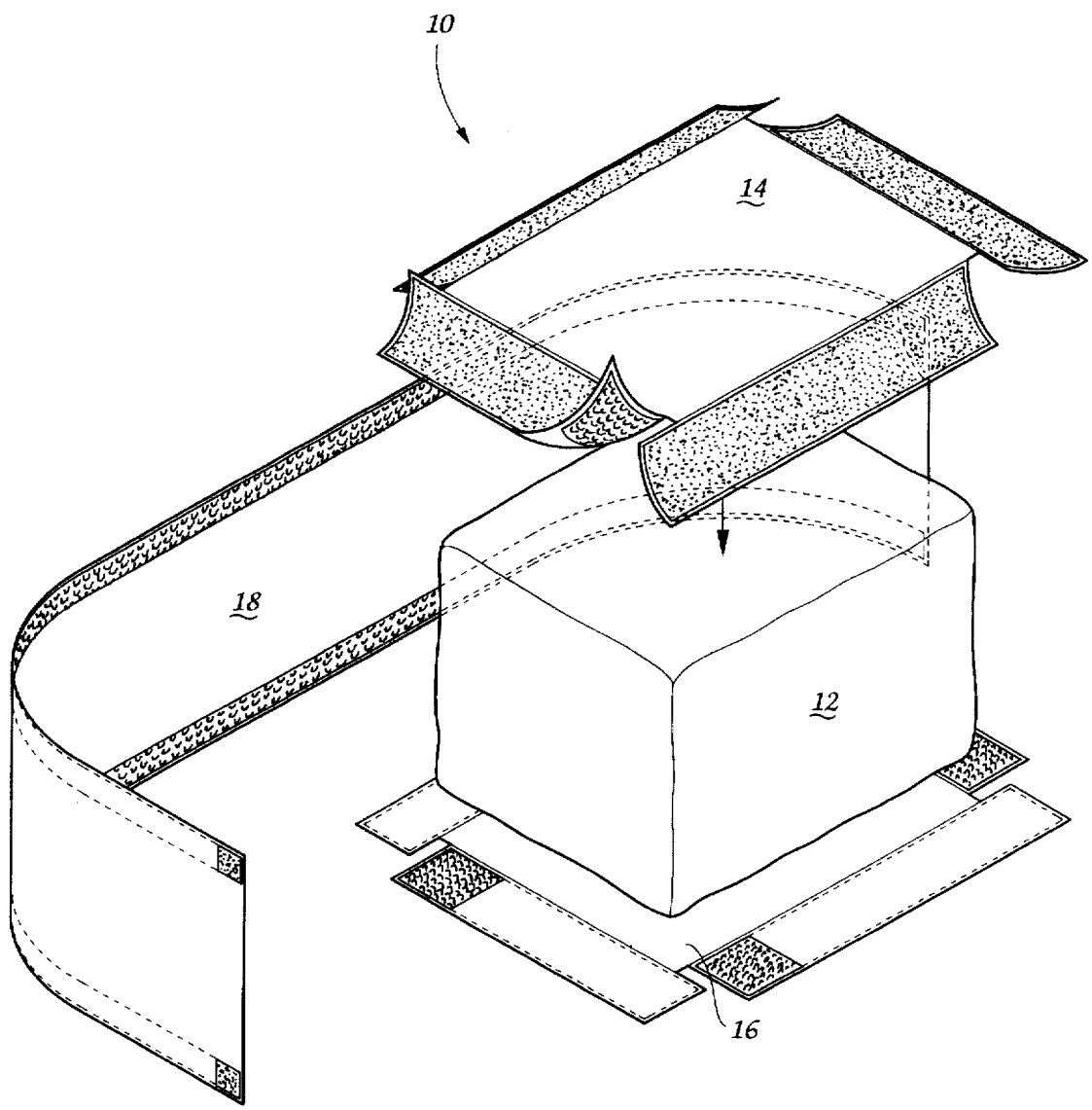
FIG. 2 is an exploded isometric view of the instant invention.

In FIG. 2, kit 10 is shown. Kit 10 comprises a top cap 14, a bottom cap 16, and a girth wrap 18. Each of these components of kit 10, when joined together, is adapted to surround and enclose a bale of compressed, resilient fibers 12. While the preferred embodiment of kit 10 comprises three pieces, the invention is not so limited. Instead, it is possible that two of the three pieces, e.g. the bottom wrap and the girth wrap, could be joined together to form a single piece, whereby the kit 10 could be a two-piece kit.

Figure 3:
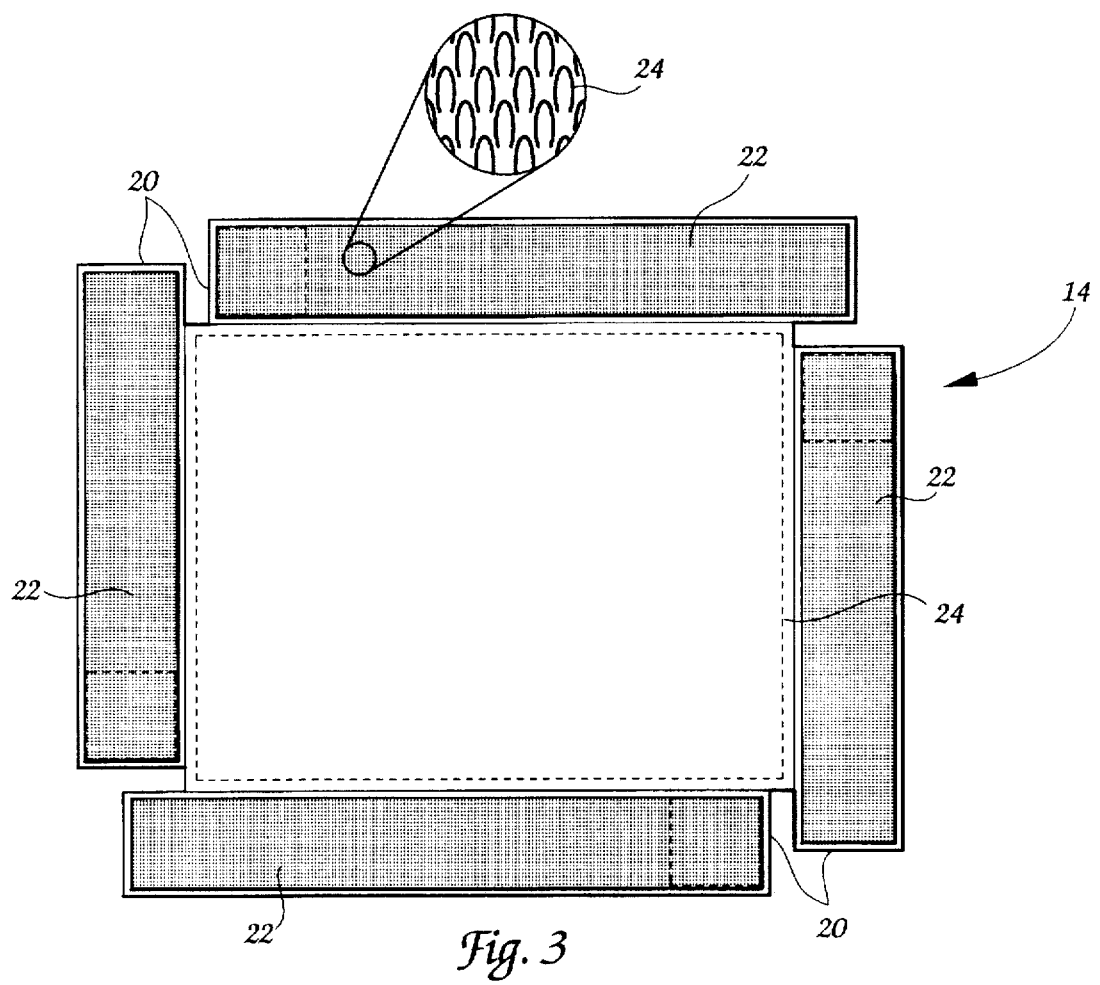
FIG. 3 is a plan view of the top cap portion of the instant invention.

Referring to FIG. 3, top cap 14 is shown. Top cap 14 and bottom cap 16 are identical, accordingly, only one shall be discussed in detail. Top cap 14 generally comprises a rectangular portion of material having an edge portion 20 located along each of its sides. A fold line 26 (shown in phantom) generally represents the outline of the bale. Fasteners 22 are affixed to each edge portion 20. Preferably, the fasteners on this cap are loops 24. This configuration appears to provide less risk of peel failure. Of course, the mushroom hooks could be used on this cap as well. Details regarding the material and the fasteners are set forth below.

Figure 4:
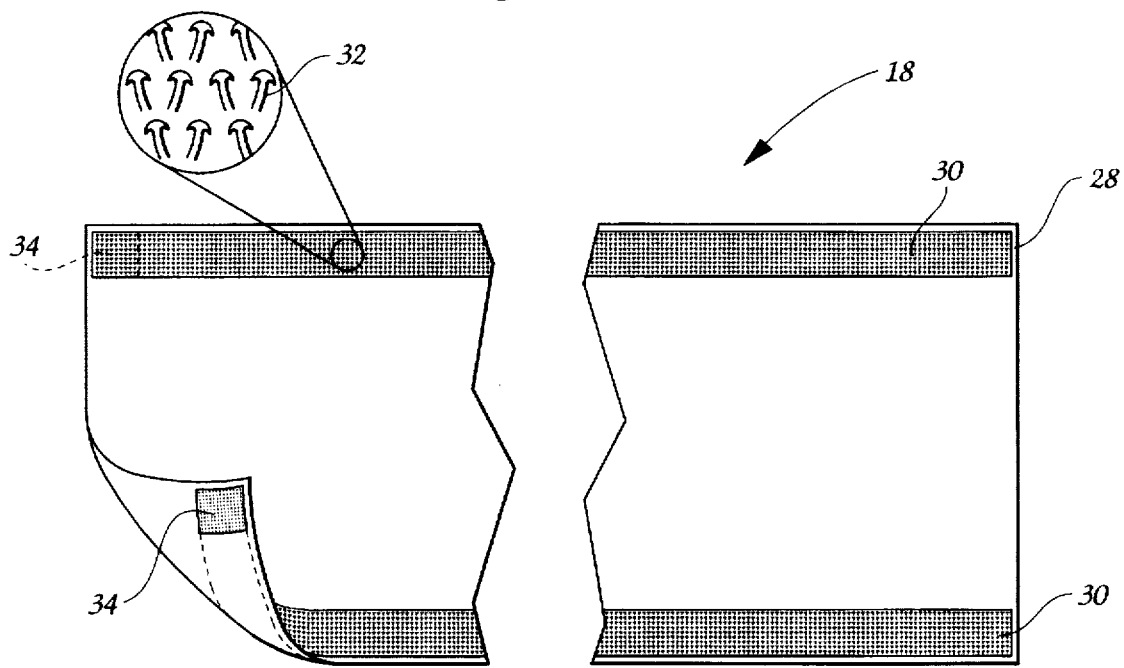
FIG. 4 is a plan view of the girth wrap portion of the instant invention with a corner thereof folded over to expose its underside.

Referring to FIG. 4, the girth wrap 18 is illustrated. Girth wrap 18 is a generally rectangular piece having an edge portion 28. Fasteners 30 are located on each edge portion 28. These fasteners are preferably mushrooms 32. The lateral edge portions 34 are provided for mating engagement with fasteners 30 so that girth wrap 18 can be secured around the bale 12 and over top cap 14 and bottom cap 16. It is noted that edge portions 34 are disposed on the side opposite fasteners 30 so that when juxtaposed with fastener 30, they can be placed in mating engagement. Details regarding the material and the fasteners are set forth below.

With regard to the material comprising the top cap 14, bottom cap 16, and girth wrap 18, it can be any material so long as it has sufficient strength to withstand the internal force of the bale of compressed, resilient fibers. For example, this material could be corrugated cardboard, cloth, film, or combinations thereof. These materials may be constructed of, for example, paper, polyester, polypropylene, polyethylene, nylon or combinations thereof. One example of such a material is a 14.5 ounce per square yard woven polyester cloth having a polyester film coated on both sides. The edges of this material should be finished so that they are snag-free.

With regard to the fasteners 22, 30, and 34, they are designed to have a shear strength (under load) of about 16–30 pounds per square inch, about 30 psi is preferred; and a peel strength (average) of about 0.6 pounds per inch. One such fastener comprises APLIX® self-gripping fasteners #220 mushroom hooks and APLIX® #200 loops. These are commercially available from APLIX, Inc. of Charlotte, N.C. These fasteners may be joined to the aforementioned materials in any manner, for example by sewing or gluing or ultrasonic welding or combination thereof. Preferably, the fasteners are sewn to the material. While the mushroom and loop fasteners mentioned above are preferred, any fastener of the foregoing type which may be reusable after 5 or more openings and has the previously mentioned shear and peel strength is also included.

The fasteners shown in the drawings are shown as continuous strips, however, segments of the fasteners may be used. Also, it is possible to make a totally recyclable bale wrap kit by matching the material of construction of the wrap kit and the fasteners.

Use of this bale wrap system results in cost savings arising from package cost savings over single use package systems and a longer reusable life. In actual use testing, this bale wrap kit was reusable for more than 6 cycles. In plant simulation tests, this bale wrap kit was reusable for 12 cycles.

The present invention maybe embodied in other specific forms without departing from the spirit or essential attributes thereof and, accordingly, reference should be made to appended claims, rather than to the foregoing specification, as indicating the scope of the invention.

We claim:

1. A method for wrapping a bale of compressed, resilient fibers comprising the steps of:
   providing a reuseable bale wrap kit, said kit including at least two pieces, each said piece, when joined together, being adapted for substantially enclosing and being adapted for containing the bale of the compressed, resilient fibers, and mushroom and loop fasteners located along an edge portion of each said piece and being adapted for joining said pieces to one another;
   providing uncompressed, resilient fibers;
   surrounding a portion of said uncompressed, resilient fibers with said kit;
   compressing said fibers; and
   engaging said mushroom and loop fasteners.

2. The method according to claim 1 wherein said mushroom and loop fasteners being adapted to have a shear strength of less than or equal to about 30 pounds per square inch.

3. A method for wrapping a bale of compressed, resilient fibers comprising the steps of:
   providing a reuseable bale wrap kit, said kit including a top cap, a bottom cap, and a girth wrap, said top cap and said girth wrap being adapted for engagement by use of mushroom and loop fasteners, said bottom cap and said girth wrap being adapted for engagement by use of mushroom and loop fasteners;
   providing uncompressed, resilient fibers;
   surrounding a portion of said uncompressed, resilient fibers with said kit;
   compressing said fibers; and
   engaging said mushroom and loop fasteners.

4. The method according to claim 3 wherein said mushroom and loop fasteners means being adapted to have a shear strength of less than or equal to about 30 pounds per square inch.

5. A method for wrapping a bale of compressed, resilient fibers comprising the steps of:
   providing a reusable bale wrap kit, said kit including at least two pieces, each said piece, when joined together, being adapted for substantially enclosing and being adapted for containing the bale of the compressed, resilient fibers, and mushroom and loop fasteners located in complimentary fashion along an edge portion of each said piece and being adapted for joining said pieces to one another;
   providing uncompressed, resilient fibers;
   surrounding a portion of said uncompressed, resilient fibers with said kit;
   compressing said fibers; and
   engaging said mushroom and loop fasteners, wherein said steps constitute one cycle and said kit is used for more than 6 said cycles.

6. A reusable kit for wrapping a bale of compressed resilient fibers comprising:
   a top cap being formed from a sheet having a plurality of edge portions, and a mushroom and loop fastener means being disposed on each said edge portion;
   a girth wrap being formed from a sheet having at least first and second edge portions, and a mushroom and loop fastener means being disposed on said first and second edge portions in complimentary fashion; and
   a bottom cap being formed from a sheet having a plurality of edge portions, and a mushroom and loop fastener means being disposed on each said edge portion;
   said mushroom and loop fastener means of said top cap being engagable with said mushroom and loop fastener means along said first edge portion of said girth wrap, and said mushroom and loop fastener means of said bottom cap being engagable with said mushroom and loop fastener means along said second edge portion of said girth wrap, wherein said mushroom and loop fasteners exhibit a designed shear strength under load of about 16–30 pounds per square inch.

7. A method for wrapping a bale of compressed, resilient fibers comprising the steps of:
   providing a reusable bale wrap kit, said kit including a top cap, a bottom cap, and a girth wrap, said top cap and said girth wrap being adapted for engagement by use of mushroom and loop fasteners, said bottom cap and said girth wrap being adapted for engagement by use of mushroom and loop fasteners;
   providing uncompressed, resilient fibers;
   surrounding a portion of said uncompressed, resilient fibers with said kit;
   compressing said fibers; and
   engaging said mushroom and loop fasteners, wherein said steps constitute one cycle and said kit is used for more than 6 said cycles.

8. The kit according to claim 7 wherein said mushroom and loop fasteners means have a shear strength of less than or equal to 30 pounds per square inch.

9. A reusable kit for wrapping a bale of compressed, resilient fibers comprising:
   a top cap being formed from a sheet having a plurality of edge portions, and a mushroom and loop fastener means being disposed on each said edge portion;
   a girth wrap being formed from a sheet having at least first and second edge portions, and a mushroom and loop fastener means being disposed on said first and said second edge portions in complimentary fashion; and
   a bottom cap being formed from a sheet having a plurality of edge portions, and a mushroom and loop fastener means being disposed on each said edge portion;
   said mushroom and loop fastener means of said top cap being engagable with said mushroom and loop fastener means along said first edge portion of said girth wrap, and said mushroom and loop fastener means of said bottom cap being engagable with said mushroom and loop fastener means along said second edged portion of said girth wrap.

* * * * *